United States Patent [19]

Yukishita

[11] 4,123,006
[45] Oct. 31, 1978

[54] SPRAY PIPE FOR USE IN A PIPE LINE

[75] Inventor: Tuyoshi Yukishita, No. 77, Aza Tenpaku, Tenpaku-cho, Toyohashi-shi, Aichi, Japan

[73] Assignees: Osamu Shiina, Tokyo; Tuyoshi Yukishita, Toyohashi, both of Japan

[21] Appl. No.: 694,538

[22] Filed: Jun. 10, 1976

[30] Foreign Application Priority Data

Jun. 20, 1975 [JP] Japan .................. 50-83658[U]

[51] Int. Cl.² ............................................. B05B 1/20
[52] U.S. Cl. ................................ 239/266; 239/450; 239/547; 239/552
[58] Field of Search ............... 239/266, 145, 450, 542, 239/547, 269, 552

[56] References Cited

U.S. PATENT DOCUMENTS

| | | | |
|---|---|---|---|
| 2,628,865 | 2/1953 | Duncan, Jr. ............... | 239/547 X |
| 3,672,571 | 6/1972 | Goodricke .................. | 239/450 X |
| 3,860,179 | 1/1975 | Costa ......................... | 239/542 |
| 3,866,833 | 2/1975 | Shibata et al. .............. | 239/450 X |
| 3,903,929 | 9/1975 | Mock ......................... | 239/145 X |

Primary Examiner—John J. Love
Attorney, Agent, or Firm—Stevens, Davis, Miller & Mosher

[57] ABSTRACT

Individual pipes which constitute a pipe line are in the form of a tube divided into a main space and a secondary space. Plug members are located at the ends of the secondary space to sealingly define the secondary space and the outer peripheral wall of the tube defining the secondary space portion is provided with one or more holes from which a fluid maintained under pressure in the secondary space is sprayed outwardly. The main space and the secondary space are connected by a passage having means for adjusting the flow rate of fluid from the main space to the secondary space.

6 Claims, 8 Drawing Figures

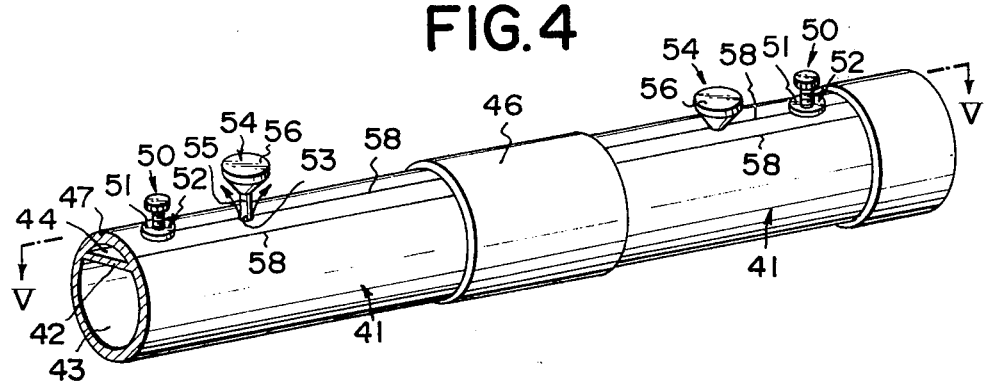
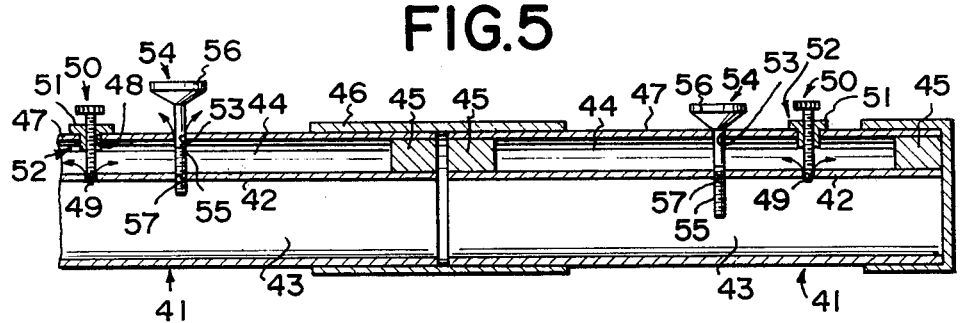
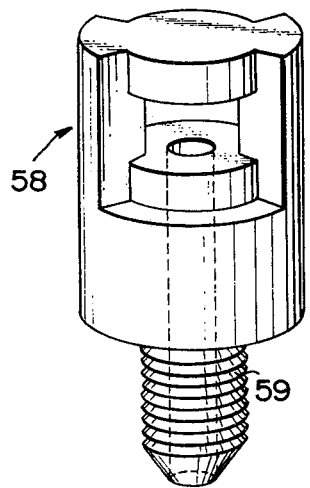
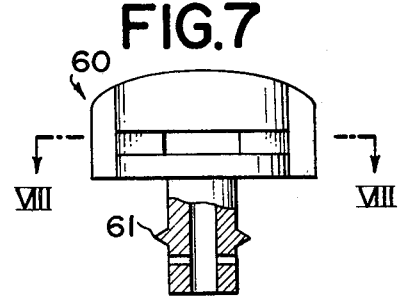
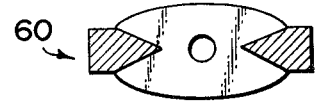

SPRAY PIPE FOR USE IN A PIPE LINE

BACKGROUND OF THE INVENTION

This invention generally relates to a spray pipe for use in a pipe line which is adapted to spray water upon a vegetable plot or golf course, to spray water upon a road or railroad for melting snow, or to supply air mixed with a suitable gas to a fish feeding pool or a waste water treating installation. More particularly, the spray pipe according to this invention includes a pressurized fluid discharging mechanism adapted to obtain a controlled discharge rate of fluid spray through a spray hole.

The prior art to which the invention pertains includes a spray pipe consisting of a divided tube provided with a pressurized fluid discharge mechanism. With the spray pipe consisting of a divided tube, it is desirable to provide a uniform discharge rate from the initial end to the terminal end, that is, throughout the pipe.

No discharge mechanism provided with a means for adjusting the flow rate of fluid from the main space into the secondary space has existed and no secondary space formed individually for each pipe section has been known.

OBJECTS OF THE INVENTION

It is, therefore, an object of the invention to provide a device in which means is provided for adjusting the flow rate of fluid from the main space into the secondary space, the device being able to obtain a desired spray discharge rate by controlling the flow rate in relation to the pressure difference between the initial and the terminal ends of the pipe.

Another object of the invention is to provide a spray pipe for use in a pipe line having a simple and inexpensive discharge mechanism.

A further object of the invention is to provide a spray pipe for use in a pipe line in which a uniform spray discharge rate can be maintained throughout the entire length of the pipe line from the initial end to the terminal end.

A further object of this invention is to provide a spray pipe for use in a pipe line wherein the spray discharge rate can be suitably adjusted within each section of the pipe line.

A general object of this invention is to provide a spray pipe for use in a pipe line for spraying water on a vegetable plot or a golf course.

A further general object of the invention is to provide a spray pipe for use in a pipe line to be utilized in spraying water for melting snow on roads or railroads.

A further object of the invention is to provide a spray pipe for use in a pipe line for supplying air mixed with a suitable gas to a fish feeding pool or a foul water treating installation.

A further object of the invention is to provide a spray pipe for use in a pipe line in which a uniform discharge rate can be obtained even in the case of inclined piping.

Other objects and features of the invention will be apparent from the accompanying drawings.

BRIEF DESCRIPTION OF THE DRAWINGS:

FIG. 4 is a perspective view of a modified form of the embodiment of FIG. 1;

FIG. 5 is a cross-sectional view taken along line V—V of FIG. 4;

FIG. 6 is a perspective view showing a spray nozzle of modified form;

FIG. 7 is a front view, partially in section, showing a spray nozzle of modified form; and FIG. 8 is a cross-sectional view taken along line VIII—VIII of FIG. 7.

Figure 1:
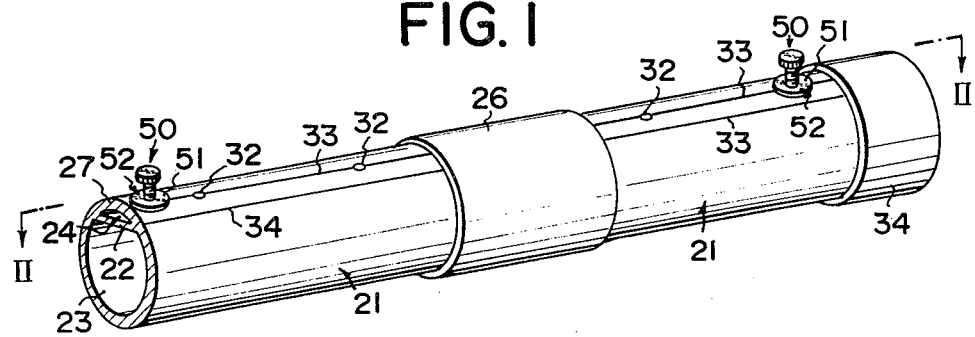
FIG. 1 is a perspective view showing a preferred embodiment according to the present invention.
Figure 2:
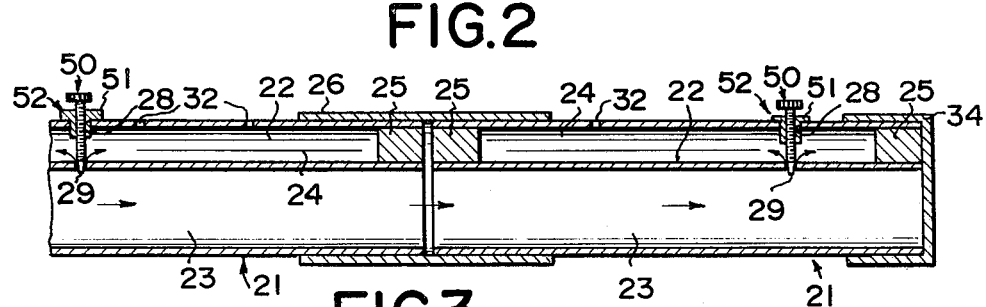
FIG. 2 is a cross-sectional view taken along line II—II of FIG. 1.

DETAILED DESCRIPTION OF THE PREFERRED EMBODIMENT:

Referring now to FIGS. 1 and 2, there is shown a tube 21 formed so that its interior space is divided into a main space 23 and a secondary space 24 by a partition wall 22 extending in its axial direction. Plug members 25 are provided at the open ends of the secondary space 24 so that the secondary space is sealed. The divided tube 21 is made of a synthetic resin, such as chloride vinyl and is formed by injection molding. A suitable number of the divided tubes 21 are connected with each other by sleeve-shaped coupling members 26 so that a pipe line is formed by the serial arrangement of the tubes 21, or by a parallel arrangement of the tubes, or alternatively, by a combination of these arrangements.

Figure 3:
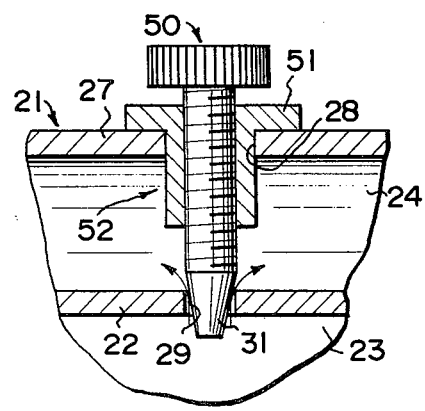
FIG. 3 is an enlarged cross-sectional view showing the mounting of an adjusting member.

As illustrated in FIG. 3, the peripheral wall 27 and the partition wall 22 of the divided tube 21 are provided with a guide hole 28 and an adjustable passage 29, respectively. As is also apparent in FIG. 3, a cylindrical insert 52, formed with a flange portion 51, is inserted into the guide hole 28 of the outer peripheral wall 27 and an adjusting member 50 is screwed into the insert 52. The adjusting member 50 passes through insert 52 and has its leading end 31 located in the passage 29 of the partition wall 22. The leading end 31 of the adjusting member is vertically movable relative to the passage 29 so as to adjust the flow rate of fluid from the main space 23 to the secondary space 24. In such a case, the leading end 31 of the adjusting member 50 is tapered so as to guide and facilitate easy passage of the pressurized fluid from the main space 23 to the secondary space 24. The insert 52 may be formed with a longer cylindrical portion so that the bottom portion of the cylindrical portion fits snugly into the passage 29 which is made large enough to accommodate the cylindrical portion. In such a case, one or more suitable holes are formed in the wall of the cylindrical portion so as to provide communication between the main space 23 and the secondary space 24 through the passage 29. In such a construction, there is no danger of the adjusting member 50 bending the partition wall 22 when the passage 29 is closed since the adjusting member need extend only as far as the lowermost hole formed at some intermediate point in the cylindrical wall of insert 52. The jetting or spraying of fluid from the secondary space 24 into the atmosphere is generally performed through means of one or more spray holes 32 provided in the peripheral wall 27 in addition to the guide hole 28. The holes 28, 29 and 32 are generally formed immediately after the molding of the double tube 21. An indication line is preferably predrawn to be used for aligning the divided tubes 21, connecting the same, or forming the spray holes 32. The flow rate of the spray through the spray holes 32 can be maintained uniform by adjusting the flow rate of the fluid, from the main space 23 into the secondary space 24 by the adjusting members 50. This means that when the flow rates, within the initial end of the pipe nearest the source of the pressurized fluid are made small and the flow rates within the terminal end of the pipe are made large by properly setting the individual adjusting members 50, an abrupt pressure drop is avoided, and, therefore, a substantially constant spray discharge rate can be obtained throughout the length of the pipe. Furthermore, it also means that the length of the pipe line can be extended. A cover member 34 is provided to close off the terminal end of the pipe line as shown in FIG. 2.

FIGS. 4 and 5 show a modified form of the invention. In this embodiment, whose construction is apparent from the drawing, a tube 41 is, as in the preceding embodiment, divided into a main space 43 and a secondary space 44 and the secondary space 44 is provided at the ends thereof with plug members 45. The connection of the divided tubes is also performed by means of a sleeve 46. The outer peripheral wall 47 and the inner partition wall 42 are provided with a guide hole 48 and an adjustable passage 49 for receiving an adjusting member 50 the vertical positioning of which adjusts the flow rate of fluid into space 44. Similar to the embodiment shown in FIGS. 1 and 2, a cylindrical insert 52, formed with a flange portion 51, is inserted into the guide hole 48 of the outer peripheral wall 47 and the adjusting member 50 is screwed into the insert 52. In this embodiment, a better spraying function is attained by using a spray nozzle 54 inserted into a spray hole 53 provided in the outer peripheral wall 47. This spray nozzle 54 consists of a rod portion and a flange portion on the head of the rod portion and is screwed into a support hole 57 provided in the partition wall 42 at a suitable position. This spray nozzle is utilized to provide a radial spray of fluid. An indication line is also drawn on the outer peripheral wall 47.

FIG. 6 is a perspective view showing another spray nozzle 58. The spray nozzle 58 is screwed into the spray hole 53 by means of the threaded portion 59.

FIGS. 7 and 8 show another spray nozzle 60. This spray nozzle is press fitted into the spray hole 53 and is provided with an annular projection 61 for preventing the removal of the spray nozzle.

These spray nozzles 58 and 60 are utilized for directional water spray. However, any suitable type of water spray may be used. Instead of the hole 29 or the hole 49, a suitable bypass tube may be provided for communicating the main space with the secondary space. In such a case, the tube is preferably provided, at an intermediate point, with a valve for adjusting the flow rate of water through the tube.

Furthermore, instead of a divided tube, two individual tubes serving as a main space tube and a secondary space tube may be used wherein the same are connected with each other by a joint provided with an adjusting member of any suitable type.

Still further, the adjusting member may be a cylindrical member of the cock type which has a cavity at its bottom and a slot, in communication with the cavity at, within its side wall. The cavity and slot of the adjusting member serve as a fluid passage from the main space tube to the secondary space tube. The adjustment of the flow rate into the secondary space is accomplished by rotation of the adjusting member.

What we claim is:

1. A pipe line comprising:
a plurality of spray pipe units, each of said pipe units having their opposite ends open and including a partition provided within the inner space thereof so as to divide said inner space into a main space and a secondary space, at least one spray hole provided within the outer peripheral wall of the pipe defining said secondary space, a plug member positioned within each of the opposite ends of the secondary space so as to seal the same, means for fluidically communicating the main space with the secondary space, and means for adjustably restricting said communicating means between fully restricted and non-restricted states so as to adjust the flow rate of fluid from the main space into the secondary space from substantially zero flow to full flow conditions;

said pipe units being serially disposed in an end-to-end manner such that the main spaces of said pipe units are fluidically communicated with each other; and sleeve-shaped coupling means disposed about the joints of said pipe units defined by the adjacent ends thereof for connecting said pipe units together in a sealed manner.

2. A pipe line according to claim 1 in which:
the means for communicating the main space with the secondary space comprises a passage provided in the partition in alignment with a guide hole provided in the outer peripheral wall,
an adjusting member is threaded into the guide hole of the outer peripheral wall, and
the leading end of the adjusting member is movable relative to the passage of the partition so as to adjust the flow rate of fluid from the main space into the secondary space.

3. A pipe line according to claim 1 in which spray nozzles are mounted in the spray holes.

4. A pipe line according to claim 1 in which an indication line is drawn on the outer peripheral wall.

5. A pipe line according to claim 2 in which the adjusting member is threaded into a cylindrical insert provided with a flange portion inserted into the guide hole.

6. A pipe line according to claim 2, wherein:
the leading end of said adjusting member is non-threaded and tapered so as to be capable of passing through said passage defined within said partition without damaging the wall portion of said partition defining said passage and yet capable of providing a fluid flow rate within said zero flow-full range.

* * * * *